United States Patent [19]

Baker et al.

[11] Patent Number: 5,013,178
[45] Date of Patent: May 7, 1991

[54] LATCHING MECHANISM

[75] Inventors: Peter E. Baker, Brislington; Michael G. Warren, Clevedon; David G. W. White, Chewstoke, all of England

[73] Assignee: The British Petroleum Company, p.l.c., London, England

[21] Appl. No.: 497,291

[22] Filed: Mar. 22, 1990

[30] Foreign Application Priority Data

Mar. 22, 1989 [GB] United Kingdom ............... 8906605

[51] Int. Cl.⁵ .................................................. B25G 3/18
[52] U.S. Cl. ..................................... 403/330; 403/322; 405/224
[58] Field of Search ............... 403/322, 330; 405/224; 166/338, 340, 341; 114/294

[56] References Cited

U.S. PATENT DOCUMENTS 4,693,389 9/1987 Kalen ............................. 403/322 X
4,694,859 9/1987 Smith III ........................ 137/614.04

FOREIGN PATENT DOCUMENTS 681182 8/1979 U.S.S.R. ............................... 403/330

Primary Examiner—Andrew V. Kundrat
Attorney, Agent, or Firm—Larry W. Evans; Joseph G. Curatolo; Scott A. McCollister

[57] ABSTRACT

A latching mechanism comprises a cam operated pivoting member within a first cylinder. The member has a lug which can project through an aperture in the cylinder. The cylinder slides into a second cylinder which has a corresponding aperture to receive the projected lug.

The pivotting member has no internal axis of pivot. Instead it has a rolling axis depending on the position of the cam and a rocking axis about a shoulder of the member in contact with the interior wall of the first cylinder.

This results in a small, light-weight structure.

5 Claims, 1 Drawing Sheet

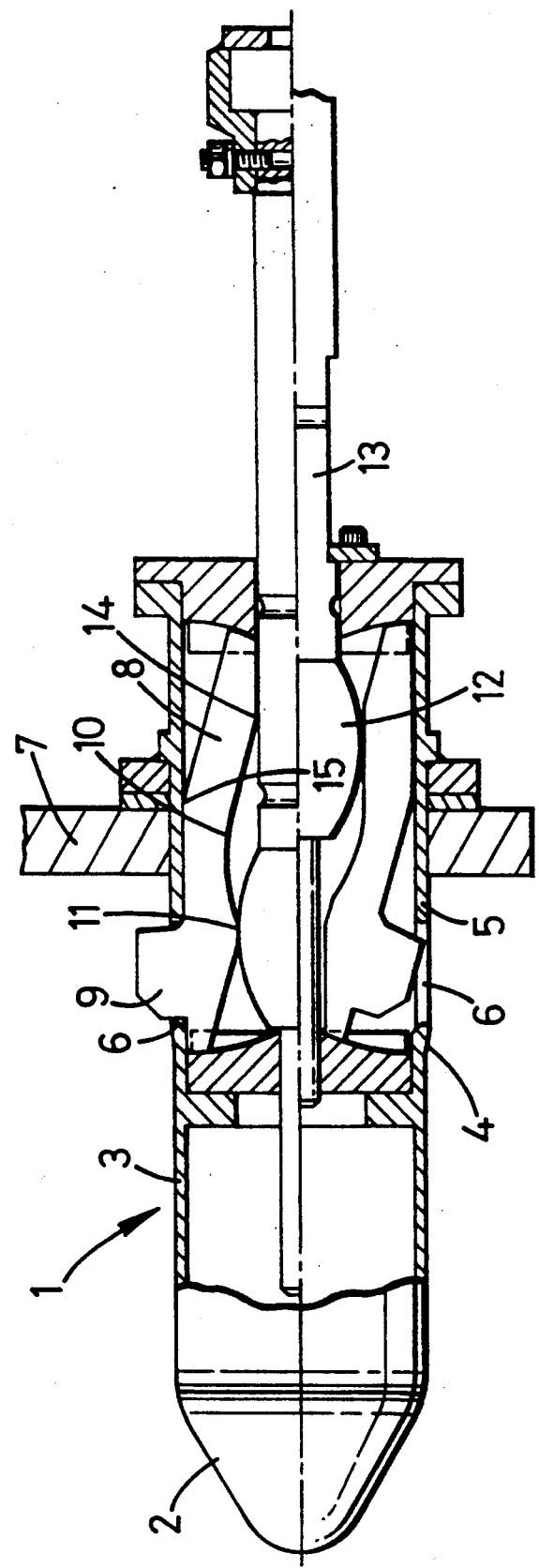

LATCHING MECHANISM

This invention relates to a bayonet-type latching mechanism which latches by axial movement only, and which is suitable for latching underwater surfaces modules used for subsea oil production, by means of a remotely operated vehicle (ROV).

In subsea oil production systems there is frequently a need to join two parts firmly but releasably. One example of parts which need to be releasably latched are junction plates used to transmit power, e.g., hydraulic and/or electrical power between two parts. The specification of our copending British patent application No. 8906604.7 discloses a fluid connector comprising (1) a male part and (2) a female part, the male part comprising:

(a) a probe containing an internal chamber in the form of a first cylindrical section, a second conical section of decreasing diameter and a third cylindrical section of smaller diameter than the first, the internal chamber containing, (b) a biassed plug having a rear section of diameter corresponding to the first cylindrical section, a mid-section (the shoulder) of dimensions corresponding to the conical section and a forward section (the neck) of diameter less than that of the third cylindrical section, the plug having a passageway leading from the rear face of the rear section to the shoulder, the female part comprising:

(c) a receiver containing an internal chamber in the form of a first cylindrical section, a second conical section of decreasing diameter and a third cylindrical section of smaller diameter than the first, the internal chamber containing, (d) biassed plug having a rear section of diameter corresponding to the first cylindrical section, a mid-section (the shoulder) of dimensions corresponding to the conical section and a forward section (the neck) of diameter less than that of the third cylindrical section, the plug having a passageway leading from the rear face of the rear section to the shoulder; the bias urging the shoulder of each plug against the conical section of each chamber in the disconnected position thereby effecting a seal, and the lengths of the necks of the plug forcing the shoulders back against the action of the bias and away from the conical sections of the chamber in the connected position, thus forming an annular channel around the necks and shoulders of the plugs; these channels being in communication with the internal chamber in the male part through the passageway in the plug of the male part, and in communication with the internal chamber in the female part through the passageway in the plug of the female part.

The female part may be compliantly mounted in a backing plate to form a stab, for example, by mounting it in the backing plate by means of a rounded shoulder so that the female part has some freedom of movement of cope with slight initial misalignment during connection.

The male part may be compliantly mounted in a housing attached to a stab plate so that the male part has more freedom of movement to cope with initial misalignement during connection, and thereby assist in connection and bringing the chambers in the male and female parts into communication.

The male and female parts described in this copending application can be used to transmit hydraulic power across the parts of a modular control system for a subsea oil production system.

The backing plate of the stab needs to be guided to and aligned with corresponding stab plate and then latched to it by a latching mechanism which can be latched and unlatched by axial movement of the stab into and out of the stab plate without any rotation of the stab or stab plate.

The present invention is concerned with such a latching mechanism.

Thus according to the present invention there is provided a latching mechanism comprising:

(a) a first cylinder containing at least one cam and at least one cam operated pivotting member within the cylinder, each pivotting member having (i) a lug adapted to project through an aperture in the cylinder in the latched position and to retract into the cylinder in the unlatched position, (ii) an internal surface having a curved recess and adjoining shoulders on either side of the recess, and (iii) an external surface having a shoulder contacting the internal surface of the cylinder, each cam being operated by a push rod and having a curved surface adapted to cooperate with the curved recess of the pivotting member to pivot the member, and with one of the adjoining shoulders to hold the member in the latched position with the lug projecting, and with the other adjoining shoulder to hold the member in the unlatched position with the lug retracted, the pivotting member having a first moving rolling pivot axis depending on the position of the cam with respect to the curved recess of the pivotting member, and a second fixed rocking pivot axis formed by the shoulder on the external surface of the pivotting member in contact with the internal surface of the cylinder, and (b) a second cylinder cooperating with the first cylinder, the first cylinder being adapted to slide into the second, the second cylinder having an aperture or apertures adapted to receive and restrain the lug(s) of the pivotting member(s) within the first cylinder in the latched position.

Preferably the first cylinder has a concial nose to facilitate entry into the second cylinder. Preferably it also has a first section of slightly smaller diameter than the second cylinder to cope with a slight initial misalignment during engagement, a shoulder, and a second section of diameter corresponding to the second cylinder to ensure final alignment.

Preferably the first cylinder contains a plurality of cams and cam operated pivotting members, most preferably four.

Preferably the latching mechanism comprises two such first and second cylinder to ensure correct orientation in addition to alignment.

It should be noted that the pivotting member has no internal axis about which it pivots. On the contrary, as the cam operates the pivotting member, the pivot axis, on the exterior of the member, moves along depending on the position of the cam, in effect rolling with the cam. The member also pivots externally about an axis formed by the shoulder of the member in contact with the interior wall of the cylinder.

This rocking and rolling member results in a structure which does not have to accommodate such a wide range of movement as previous mechanism and thus can be made smaller and lighter for the same latching effect, i.e. the extent to which the lug projects through the aperture.

The invention is illustrated with reference to the accompanying FIGURE which is a composite drawing of the aforementioned first cylinder, the upper half of the drawing showing a latch in the latched position and the bottom half showing the latch in the unlatched position.

The mechanism comprises a first cylinder 1 having a conical nose 2, a first section 3, a shoulder 4 and a second section 5 of slightly greater diameter than the first section 3. The second section 5 contains four apertures 6, two of which are shown. The cylinder 1 is mounted in a backing plate 7.

The cylinder contains four pivotting arms 8. Each has a lug 9, a recess 10, two internal shoulders 11 and 14 adjoining the recess 10 at either end and an external shoulder 15 contacting the internal surface of the cylinder 1. The position of each arm 8 is determined by a cam 12 which is operated by an actuating rod 13.

In the lower half of the drawing, the cam 12 cooperates with the recess 10 and the arm 8 is pivotted to the unlatched position with the lug 9 withdrawn into the aperture 6 and the cam 12 bearing against the shoulder 14.

In the upper half of the drawing, the cam 12 cooperates with the projection 11 and the arm 8 is pivotted to the latched position with the lug 9 protruding through the aperture 6 and the cam 12 bearing against the shoulder 11.

For reasons of clarity the cooperating second cylinder of the latch mechanism is not shown but it is to be understood that it is a cylinder of uniform diameter corresponding to the diameter of the second section 5 of the first cylinder 1 and having apertures aligned with the aperatures 6 in the first cylinder to receive the lugs 9 in the latched position. It, too, is mounted on a separate backing plate.

In moving the cam 12 from the position shown in the bottom half of the drawing to that shown in the top half, or vice versa, the arm 8 is rolled by the action of the cam 12 on the recess 10 and rocks about an axis formed by the shoulder 15.

When the backing plates are latched together, clearly, the equipment mounted on the backing plates such as hydraulic and or electrical connectors, are also latched together.

We claim:
1. A latching mechanism comprising:
   (a) first cylinder containing at least one cam and at least one cam operated pivotting member within the cylinder, each pivotting member having
      (i) a lug adapted to project through an aperture in the cylinder in the latched position and to retract into the cylinder in the unlatched position,
      (ii) an internal surface having a curved recess and adjoining shoulders on either end of the recess, and
      (iii) an external surface having a shoulder contacting the internal surface of the cylinder, each cam being operated by a push rod and having a curved surface adapted to cooperate with the curved recess of the pivotting member to pivot the member, and with one of the adjoining shoulders to hold the member in the latched position with the lug projecting, and with the other adjoining shoulder to hold the member in the unlatched position with the lug retracted, the pivotting member having a first moving rolling pivot axis depending on the position of the cam with respect to the curved recess of the pivotting member, and a second fixed rocking pivot axis formed by the shoulder on the external surface of the pivotting member in contact with the internal surface of the cylinder, and
   (b) a second cylinder cooperating with the first cylinder, the first cylinder being adapted to slide into the second, the second cylinder having an aperture or apertures adapted to receive and restrain the lug(s) of the pivotting member(s) within the first cylinder in the latched position.

2. A latching mechanism according to claim 1 wherein the first cylinder has a conical nose to facilitate entry into the second cylinder.

3. A latching mechanism according to claim 1 wherein the first cylinder has a first section of slightly smaller diameter than the second cylinder, a shoulder and a second section of diameter corresponding to the second cylinder.

4. A latching mechanism according to claim 1 comprising a plurality of cams and cam operated pivotting members.

5. A latching mechanism according to claim 1 containing two such first and second cylinders.

* * * * *